United States Patent

Challberg et al.

[11] Patent Number: 5,930,320
[45] Date of Patent: Jul. 27, 1999

[54] ASSEMBLIES AND METHODS FOR MITIGATING EFFECTS OF REACTOR PRESSURE VESSEL EXPANSION

[75] Inventors: Roy C. Challberg, Livermore; Perng-Fei Gou, Saratoga; Cherk Lam Chu, San Jose, all of Calif.; Robert P. Oliver, Topsham, Me.

[73] Assignee: General Electric Company, Schenectady, N.Y.

[21] Appl. No.: 09/014,216

[22] Filed: Jan. 27, 1998

Related U.S. Application Data

[60] Provisional application No. 60/045,316, May 1, 1997.
[51] Int. Cl.⁶ ........................................................ G21C 9/00
[52] U.S. Cl. ............................ 376/285; 376/293; 376/302; 376/461
[58] Field of Search ....................................... 376/282, 293, 376/302, 461; 52/167.1, 167.4, 167.6; 405/229

[56] References Cited

U.S. PATENT DOCUMENTS

| | | | |
|---|---|---|---|
| 4,744,941 | 5/1988 | Bacher et al. | 376/285 |
| 4,859,402 | 8/1989 | Tupper et al. | 376/285 |
| 5,217,681 | 6/1993 | Wedellsborg et al. | 376/461 X |
| 5,379,331 | 1/1995 | Brouttelande | 376/285 |
| 5,740,216 | 4/1998 | Morishita | 376/285 |

*Primary Examiner*—Charles T. Jordan
*Assistant Examiner*—Jack Keith
*Attorney, Agent, or Firm*—Armstrong Teasdale LLP

[57] ABSTRACT

Support assemblies for allowing RPV radial expansion while simultaneously limiting horizontal, vertical, and azimuthal movement of the RPV within a nuclear reactor are described. In one embodiment, the support assembly includes a support block and a guide block. The support block includes a first portion and a second portion, and the first portion is rigidly coupled to the RPV adjacent the first portion. The guide block is rigidly coupled to a reactor pressure vessel support structure and includes a channel sized to receive the second portion of the support block. The second portion of the support block is positioned in the guide block channel to movably couple the guide block to the support block.

19 Claims, 6 Drawing Sheets

ASSEMBLIES AND METHODS FOR MITIGATING EFFECTS OF REACTOR PRESSURE VESSEL EXPANSION

CROSS-REFERENCE TO RELATED APPLICATION

This application claims the benefit of U.S. Provisional Application No. 60/045,316, filed May 1, 1997.

GOVERNMENT RIGHTS STATEMENT

The Government of the United States of America has rights in this invention pursuant to Contract No. DE-AC03-90SF18494 awarded by the U.S. Department of Energy.

FIELD OF THE INVENTION

This invention relates generally to nuclear reactors and, more particularly, to assemblies for allowing expansion of a nuclear reactor pressure vessel while simultaneously mitigating effects of such expansion.

BACKGROUND OF THE INVENTION

Boiling water nuclear reactors typically include a reactor core located within a reactor pressure vessel (RPV). A known RPV includes a substantially cylindrical shell. The shell, for example, can be about twenty feet in diameter and about seven inches thick.

The cylindrical shell is closed at its top end by a removable top head. The top head is removable so that components, such as fuel bundles, located in the RPV can be accessed. The RPV cylindrical shell is closed at its bottom end by a dome shaped bottom head assembly welded to the shell.

The RPV typically is supported by a conical RPV support skirt and reactor pedestal, and extends into an upper containment. Particularly, one end of the support skirt is welded to the RPV and the other end of the support skirt is secured directly to the reactor pedestal.

Known support skirts typically restrict horizontal, vertical, azimuthal and radial movement of the RPV. Particularly, such skirts are directly coupled between the RPV and the reactor pedestal, and are configured to substantially prevent any movement of the RPV during operation. Restraining vertical, horizontal and azimuthal RPV movement is, of course, desirable to maintain the stability of both the RPV and the RPV internals.

During RPV operation, heat generated within the RPV causes the RPV to expand. Heat and other forces typically cause the RPV to expand radially and vertically. However, the reactor pedestal remains cool, at least with respect to the RPV, and thus typically does not expand. Accordingly, the reactor pedestal does not accommodate radial RPV expansion, i.e., resists radial movement of the support skirt, and may cause high stresses adjacent the support skirt. Over the life of the RPV, these high stresses may reduce the fatigue life of the RPV, which is undesirable.

Accordingly, it would be desirable to provide a support assembly which substantially restrains azimuthal, lateral, and vertical RPV movement while allowing radial RPV expansion. It also would be desirable to provide such an assembly which is easy to install and maintain.

SUMMARY OF THE INVENTION

These and other objects may be attained by a nuclear reactor which, in one embodiment, includes a support assembly mitigating the effects of reactor pressure vessel (RPV) expansion while accommodating some movement of the RPV. More particularly, and in accordance with one embodiment of the present invention, the support assembly includes a support block and a guide block. The support block includes a first portion and a second portion, and the first portion is rigidly coupled to the reactor pressure vessel. The second portion of the support block is substantially "T" shaped, and is configured to movably couple to the guide block.

The guide block is rigidly coupled to the reactor pedestal and includes a channel. The channel extends substantially radially with respect to the reactor pressure vessel and is sized to receive the second portion of the support block. Particularly, the channel is substantially "T" shaped having a neck portion and a head portion, and the neck portion is narrower than the head portion. The second portion of the support block is positioned within the guide block channel so that a head of the second portion is located within the head portion of the channel and so that a neck of the second portion is located within the neck portion of the channel.

In operation, as the RPV expands or moves radially, e.g., because of heat and other forces, the second portion of the support block slides within the guide block channel. However, the "T" shaped second portion and the "T" shaped channel substantially restrains vertical, horizontal and azimuthal movement of the RPV.

By using the above described support assembly, radial expansion of the reactor pressure vessel is substantially unrestrained, yet lateral, azimuthal and vertical movements are restrained. Such assembly is believed to facilitate providing reduced stresses in the reactor pressure vessel wall. In addition, such assembly is believed to be easy to install and maintain.

DETAILED DESCRIPTION

Figure 1:
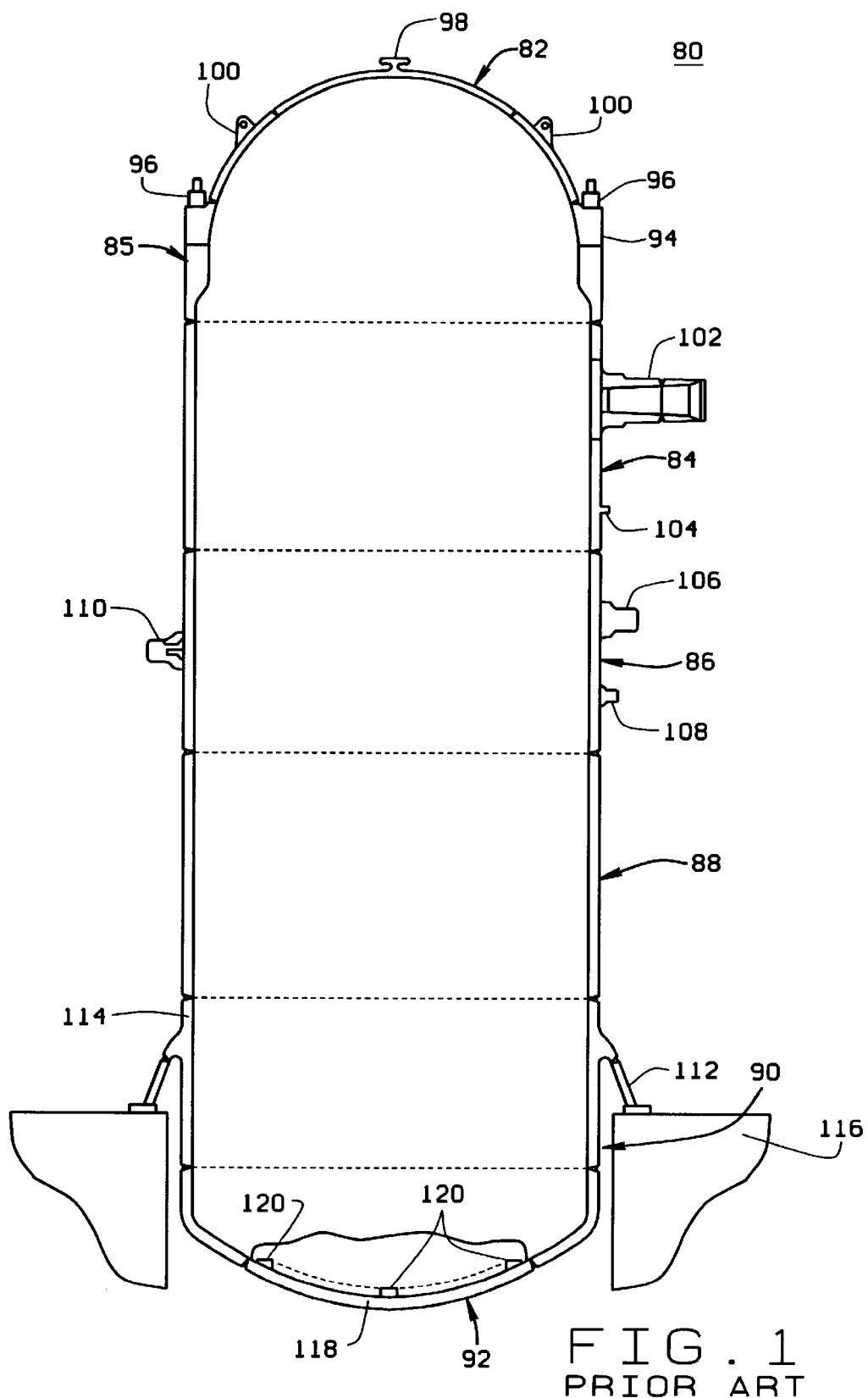
FIG. 1 is a schematic illustration of a reactor pressure vessel.

FIG. 1 is a schematic illustration of a reactor pressure vessel (RPV) 80. RPV 80 includes a top head 82, four substantially cylindrical shell courses 84, 86, 88 and 90, and a bottom head assembly 92. Top head 82 includes a head flange 94. First shell course 84 is attached to a vessel flange course 85. Top head 82 is bolted to flange course 85 by bolts 96 which extend through head flange 94. Top head 82 also includes a head spray and vent nozzle 98 and lifting flanges 100 used when lifting top head 82 from flange course 85.

First shell course 84 includes main steam nozzles 102 through which steam flows out of the RPV 80. Stabilizer brackets 104 also are formed on first shell course 84. Second shell course 86 has a number of nozzles 106, 108 and 110 formed therein. Fourth shell course 90 includes a substantially rigid support skirt 112 welded to a wall 114 thereof. Support skirt 112 also is bolted to a reactor pedestal 116 and is utilized to support RPV 80 within the reactor housing (not shown).

Bottom head assembly 92 includes a bottom head dome 118 having a plurality of stub tubes 120 welded thereto. Stub tubes 120 are substantially cylindrical and each stub tube 120 has a bore (not shown) extending therethrough. The bore of each stub tube 120 is aligned with an opening (not shown) in bottom head dome 118. Components such as control rod drives, incore instruments, pressure instrument nozzles, and drain nozzles extend through such bottom head dome openings and stub tube bores and penetrate into RPV 80.

As explained above, rigidly coupling RPV 80 directly to reactor pedestal 116 results in high stresses in RPV 80, and reduces the fatigue life of RPV 80. Particularly, rigidly coupling RPV 80 directly to reactor pedestal 116 with support skirt 112 substantially restricts radial expansion of RPV wall 114 in addition to restricting horizontal, vertical and azimuthal movement of RPV 80. Accordingly, any radial expansion of RPV wall 114 may generate substantial stress in RPV wall 114 adjacent support skirt 112.

FIG. 1 is provided primarily for illustrative purposes to show a typical support skirt 112 coupled to a reactor pedestal 116. The present invention, as described below, can be used in many RPV configurations other than RPV 80.

In accordance with one embodiment of the present invention, a support assembly is utilized to allow substantially unrestrained radial expansion of RPV 80 and simultaneously restrain lateral, vertical and azimuthal movement of RPV 80. The support assembly thus reduces stresses on RPV wall 114.

Figure 2:
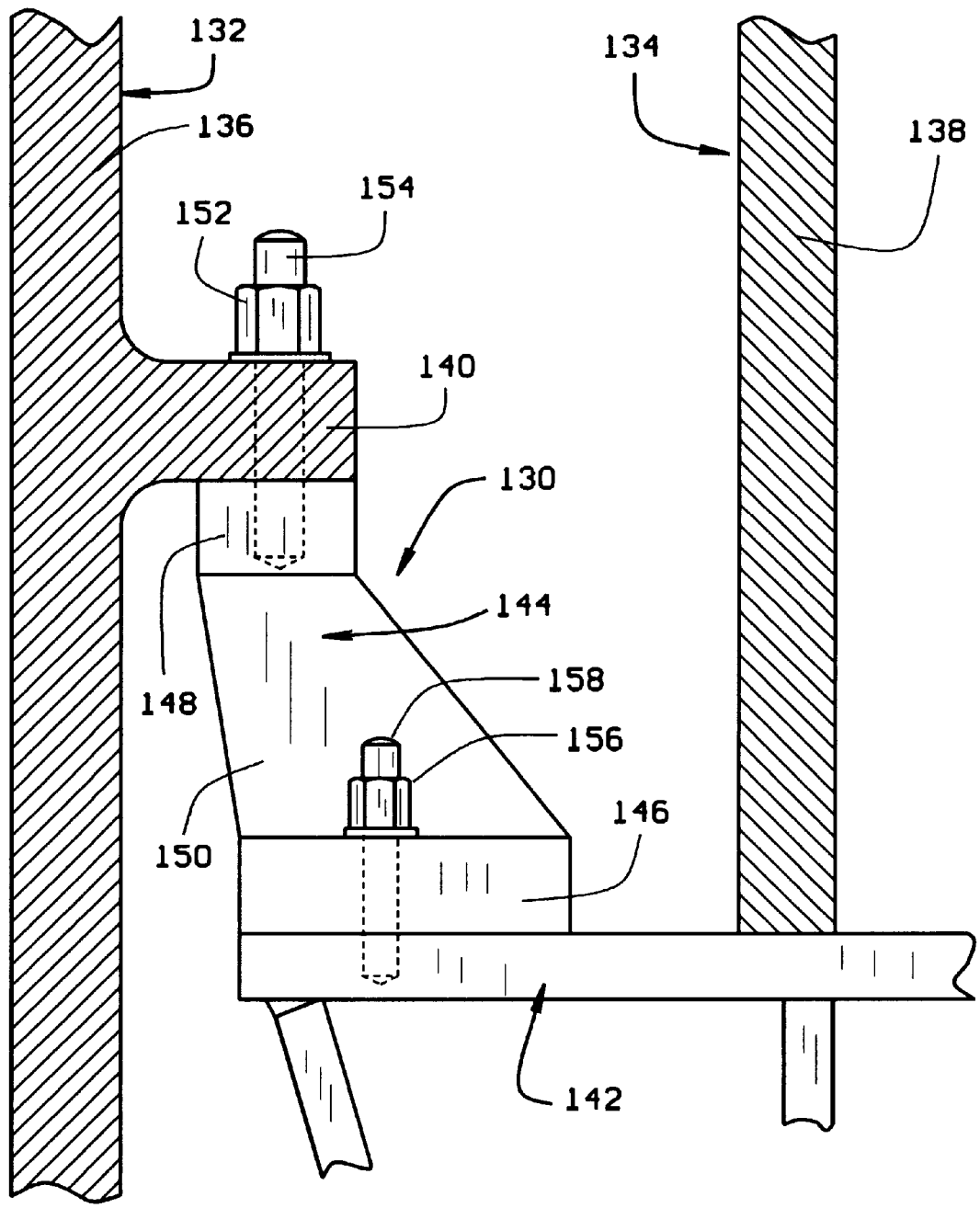
FIG. 2 is a schematic, partial side view illustration of a support assembly and a reactor pressure vessel in accordance with one embodiment of the present invention.

FIG. 2 is a schematic, partial side view illustration of a support assembly 130 and a reactor pressure vessel (RPV) 132. RPV 132 is located within a reactor shield 134, and a RPV wall 136 is spaced from a shield wall 138. A flange 140 extends from RPV wall 136 into the space between RPV wall 136 and shield wall 138. Similarly, a reactor support structure 142, e.g., a reactor pedestal, is coupled to shield wall 138 and extends into the space between RPV wall 136 and shield wall 138. Flange 140 is spaced from reactor pedestal 142 and support assembly 130 is coupled between flange 140 and reactor pedestal 142.

Support assembly 130 includes a first support member 144, also referred to herein as a support block, and a second support member 146, also referred to herein as a guide block. A first portion 148 of support block 144 is adjacent RPV flange 140 and a second portion 150 extends from first portion 148. Bolts 154 extend from first portion 148 and nuts 152 are engaged to bolts 154 and tightened against flange 140 (only one nut 152 and one bolt 154 are shown in FIG. 2) to rigidly couple support block 144 to flange 140. Guide block 146 is adjacent reactor pedestal 142, and second portion 150 of support block 144 is movably coupled to guide block 146. Guide block 146 is rigidly coupled to reactor pedestal 142 by bolts 158 extending from pedestal 142 and nuts 156 engaged to bolts 158 and tightened against guide block 146 (only one nut 156 and one bolt 158 are shown in FIG. 2).

Figure 3:
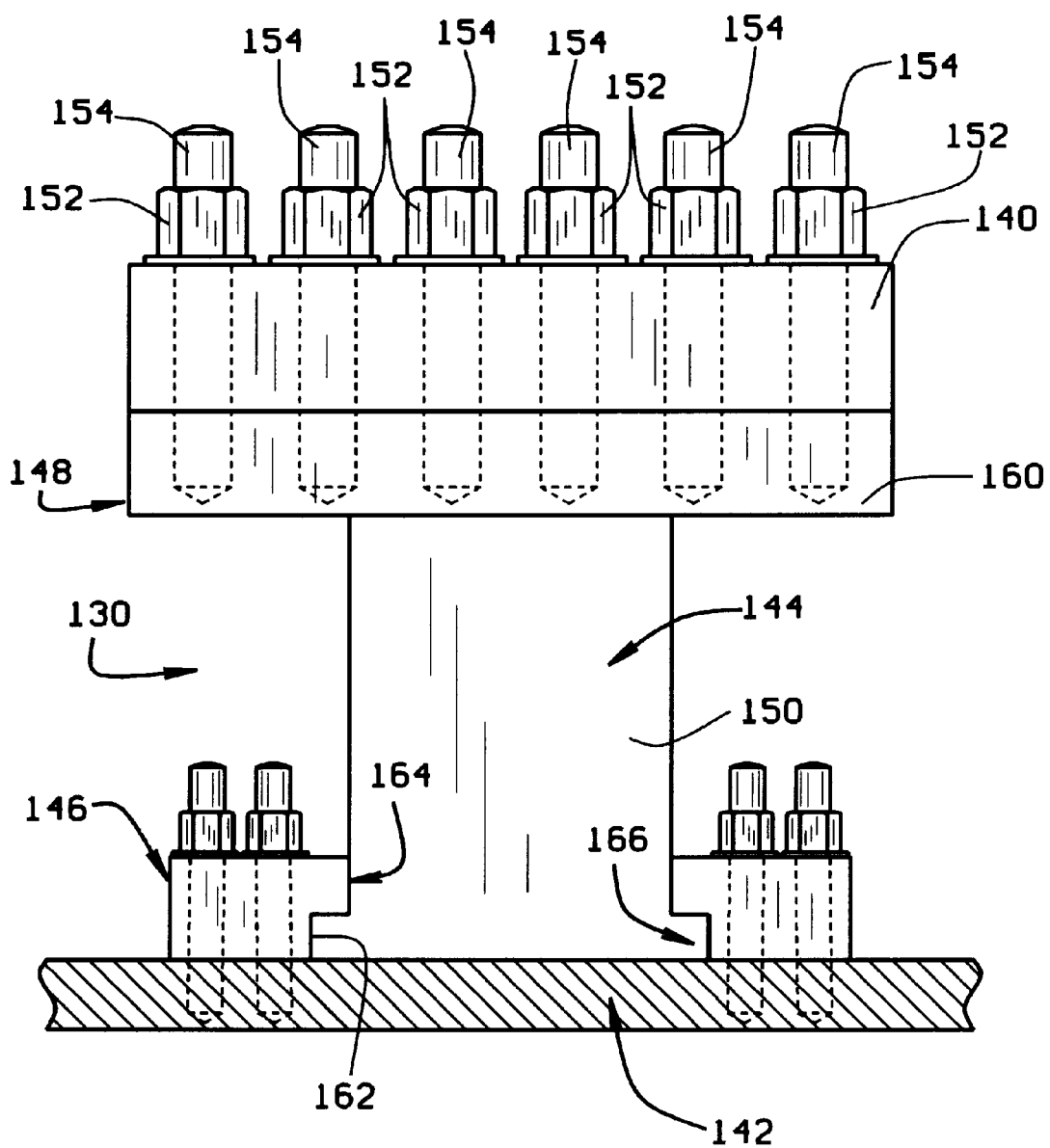
FIG. 3 is a schematic, partial front view illustration of the reactor pressure vessel and support assembly shown in FIG. 2.

FIG. 3 is a schematic, partial front view illustration of support assembly 130 and reactor pressure vessel 132. As shown more clearly, first portion 148 of support block 144 includes a base plate 160 which is rigidly secured to flange 140 with nuts 152 and bolts 154, respectively. Second portion 150 of support block 144 extends from first portion 148 and is substantially "T" shaped. Guide block 146 includes a channel 162 which extends substantially radially with respect to RPV 132 and is sized to receive second portion 150 of support block 144. Particularly, channel 162 is substantially "T" shaped and includes a neck portion 164 and a head portion 166.

Figure 4:
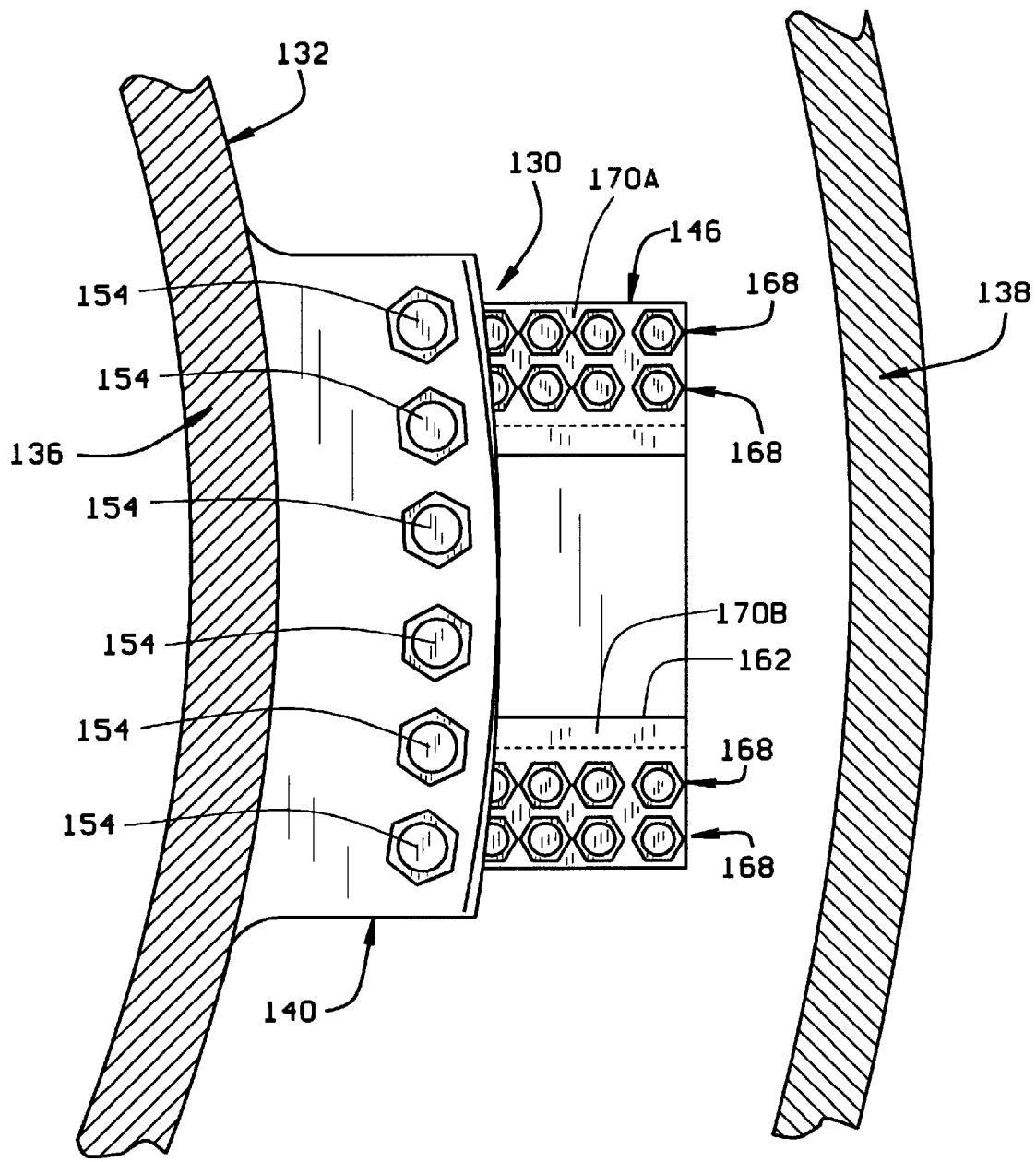
FIG. 4 is schematic, partial top view illustration of the reactor pressure vessel and support assembly shown in FIG. 2.

FIG. 4 is schematic, partial top view illustration of support assembly 130 and reactor pressure vessel 132. As explained above, RPV flange 140 extends substantially horizontally between RPV wall 136 and shield wall 138. Several rows 168 of nuts 156 and bolts 158, respectively, are utilized to secure guide block 146 to reactor pedestal 142. Particularly, two rows 168 of nuts and bolts extend through guide block 146 on opposite sides 170A and 170B, respectively, of channel 162.

Figure 5:
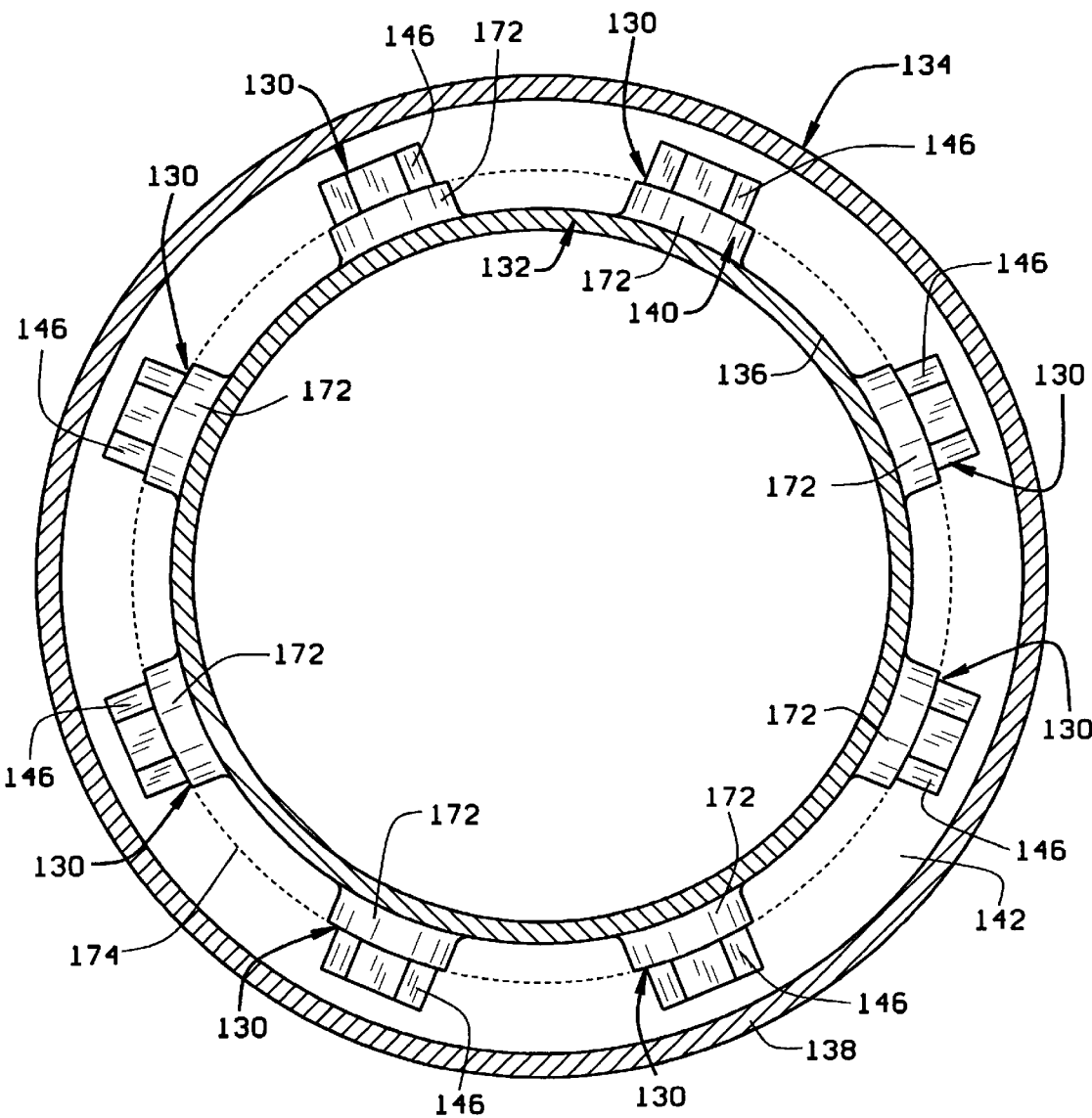
FIG. 5 is a schematic top view illustration of the reactor pressure vessel shown in FIG. 2.

FIG. 5 is a schematic top view illustration of reactor pressure vessel 132. While eight support assemblies 130 are shown coupled to vessel 132, fewer than eight or more than eight support assemblies 130 may be utilized. RPV flange 140 is integral with RPV wall 136 and has a segmented ring shape including eight flange portions 172. Alternatively, RPV flange 140 may have a continuous ring shape 174 (shown in dashed lines). Flange portions 172 are substantially equidistantly spaced about RPV wall 136, and each flange portion 172 is coupled to one of support assemblies 130, which also are equidistantly spaced about a circumference of RPV 132.

In operation, support assemblies 130 are coupled between flange portions 172 and reactor support member 142. Each guide block 146 is rigidly secured to reactor support member 142 so that each guide block channel 162 extends substantially radially with respect to RPV 132. If RPV wall 136 expands because of the heat or other forces, support assemblies 130 allow radial expansion of RPV wall 136 while simultaneously restraining lateral, vertical and azimuthal movement of RPV wall 136. Particularly, as RPV wall 136 radially expands, second portions 150 of each support block 144 slide within respective guide block channels 162. However, guide block 146 and guide block channels 162 substantially restrain lateral, vertical, and azimuthal movement of RPV wall 136.

To further enable substantially unrestricted radial expansion, the surfaces of each guide block channel 162 may be lubricated. Similarly, the surfaces of "T" shaped portion 150 of each support block 144 may be lubricated.

The above described support assembly 130 enables substantially unrestricted RPV radial expansion while simultaneously restraining lateral, vertical, and azimuthal RPV movement. In addition, such assembly 130 is believed to be easy to install and maintain. Furthermore, it is believed that the spaces between adjacent flange portions 172 provide a flow path for cooling water and a vent path for circulation of steam and other gases. Of course, it is to be understood that assembly 130 described above is an exemplary assembly and various alternative embodiments are possible and contemplated.

Figure 6:
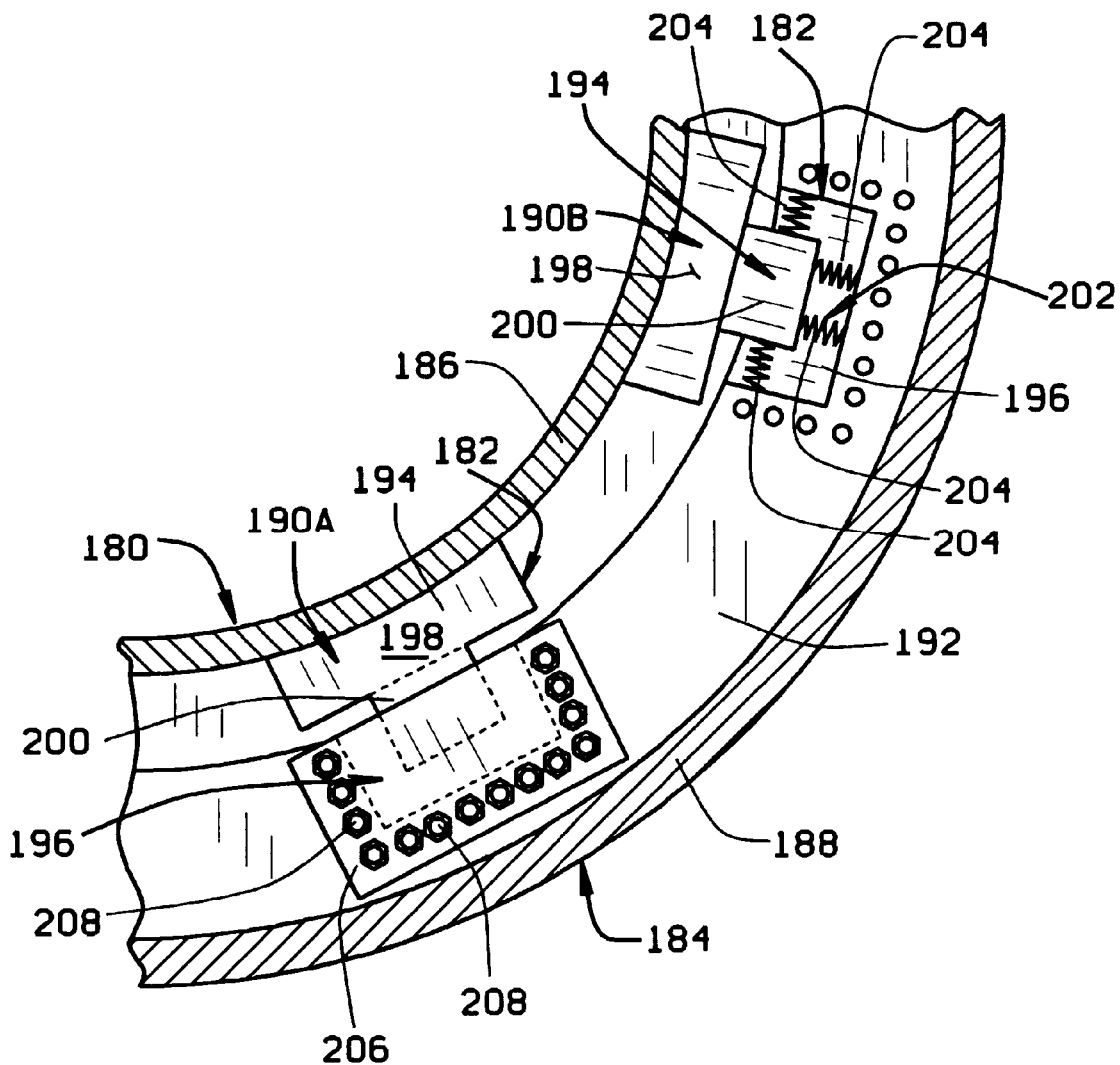
FIG. 6 is a schematic, partial top view illustration of a support assembly and reactor pressure vessel in accordance with another embodiment of the present invention.

FIG. 6 is a schematic, partial top view illustration of a reactor pressure vessel (RPV) 180 and two support assemblies 182 in accordance with another embodiment of the present invention. RPV 180 is located within a reactor shield 184, and a RPV wall 186 is spaced from a shield wall 188. A flange having a segmented ring shape (only two segments 190A and 190B are shown in FIG. 6) extends from RPV wall 186 into the space between RPV wall 186 and shield wall 188. Similarly, a reactor support structure 192, e.g., a reactor pedestal, is coupled to shield wall 188 and extends into the space between RPV wall 186 and shield wall 188. Each support assembly 182 is spaced from the other support assembly 182 and is coupled between one of flange segments 190A and 190B, respectively, and reactor pedestal 192.

Each support assembly 182 includes a support block 194 and a guide block 196. A first portion 198 of each support block 194 is rigidly coupled to one of flange segments 190A and 190B, respectively, and a second portion 200 extends from each first portion 198. Each one of guide blocks 196 is rigidly coupled to reactor pedestal 192 and is movably coupled to one of respective support blocks 194.

Guide blocks 196 each include a channel 202 (only one channel 202 is shown in FIG. 6) which extends substantially radially with respect to RPV 180. The channels 202 each are sized to receive one of second portions 200 of support blocks 194, respectively, and are substantially "T" shaped, as described above with respect to guide blocks 146.

Each support assembly 182 also includes four seismic isolators 204. Of course, each support assembly 182 could include either more than four, e.g., five or six, or fewer than four, e.g., one, two, or three, seismic isolators 204. Seismic isolators 204 are positioned between each movably coupled guide block 196 and support block 194. Seismic isolators 204 are configured to dampen the amplitude of vibrations caused by ground accelerations. For example, seismic isolators 204 may be constructed of a very stiff and elastic material such as neoprene.

Cover plates 206 (only one cover plate 206 is shown in FIG. 6) are secured to reactor pedestal 192 and each cover plate 206 substantially covers one of support assemblies 182. Particularly, each cover plate 206 is bolted to reactor pedestal 192 with bolts 208, and each cover plate 206 is configured to substantially protect the components, e.g., guide block 196, support block 194, and seismic isolators 204, of each support assembly 182 coupled to RPV 180.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, while the RPV flange described above is a segmented ring, the flange may be a continuous ring. Accordingly, the spirit and scope of the invention are to be limited only by the terms of the appended claims.

We claim:

1. A support assembly for a reactor pressure vessel of a nuclear reactor, the nuclear reactor including a reactor pressure vessel support structure, said support assembly comprising:

a support block coupled to the reactor pressure vessel; and a guide block coupled to the reactor pressure vessel support structure, said support block movably coupled to said guide block.

2. A support assembly in accordance with claim 1 wherein said support block is rigidly coupled to the reactor pressure vessel.

3. A support assembly in accordance with claim 1 wherein said guide block is rigidly coupled to the reactor pressure vessel support structure.

4. A support assembly in accordance with claim 1 wherein said guide block includes a channel sized to receive a portion of said support block.

5. A support assembly in accordance with claim 4 wherein said guide block channel is substantially "T" shaped.

6. A support assembly in accordance with claim 1 further comprising at least one seismic isolator coupled between said guide block and said support block.

7. A support assembly in accordance with claim 1 wherein the reactor pressure vessel includes a flange extending therefrom, and wherein said support block is coupled to said flange.

8. A support assembly in accordance with claim 7 wherein said flange has a substantially segmented ring shape including a plurality of flange portions, and wherein said support block is coupled to one of said flange portions.

9. A nuclear reactor comprising:

a reactor pressure vessel;

a reactor pressure vessel support structure; and at least one support assembly coupled between said reactor pressure vessel and said reactor pressure vessel support structure, said support assembly comprising a support block coupled to said reactor pressure vessel, and a guide block coupled to said reactor pressure vessel support structure, said support block movably coupled to said guide block.

10. A nuclear reactor in accordance with claim 9 wherein said support block is rigidly coupled to said reactor pressure vessel.

11. A nuclear reactor in accordance with claim 9 wherein said guide block is rigidly coupled to said reactor pressure vessel support structure.

12. A nuclear reactor in accordance with claim 9 wherein said guide block includes a channel sized to receive a portion of said support block.

13. A nuclear reactor in accordance with claim 12 wherein said channel is substantially "T" shaped.

14. A nuclear reactor in accordance with claim 9 wherein said support assembly further comprises at least one seismic isolator coupled between said guide block and said support block.

15. A nuclear reactor in accordance with claim 9 wherein said reactor pressure vessel comprises a flange extending therefrom, and wherein said support assembly is coupled to said flange.

16. A nuclear reactor in accordance with claim 9 comprising at least two support assemblies, each said support assembly coupled between said reactor pressure vessel and said reactor pressure vessel support structure.

17. A nuclear reactor in accordance with claim 16 wherein said support assemblies are spaced substantially equidistantly about a circumference of said reactor pressure vessel.

18. A method of reducing stress on a nuclear reactor pressure vessel utilizing a support assembly, the nuclear reactor pressure vessel positioned adjacent a reactor pedestal, the support assembly including a support block movably coupled to a guide block, said method comprising the steps of:

positioning the support assembly between a portion of the reactor pedestal and a portion of the reactor pressure vessel; and coupling the support block to the reactor pressure vessel.

19. A method in accordance with claim 18 further comprising the step of coupling the guide block to the reactor pedestal.

* * * * *